United States Patent
Mihály et al.

(10) Patent No.: US 11,240,353 B2
(45) Date of Patent: Feb. 1, 2022

(54) DATA TRANSMISSION IN WIRELESS COMMUNICATIONS NETWORKS

(71) Applicant: Telefonaktiebolaget LM Ericsson (publ), Stockholm (SE)

(72) Inventors: Attila Mihály, Dunakeszi (HU); Marcus Ihlar, Älvsjö (SE); Szilveszter Nádas, Budapest (HU); Robert Skog, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 16/641,385

(22) PCT Filed: Aug. 24, 2017

(86) PCT No.: PCT/EP2017/071316
§ 371 (c)(1),
(2) Date: Feb. 24, 2020

(87) PCT Pub. No.: WO2019/037852
PCT Pub. Date: Feb. 28, 2019

(65) Prior Publication Data
US 2020/0195757 A1    Jun. 18, 2020

(51) Int. Cl.
*H04L 29/06* (2006.01)
*H04L 29/08* (2006.01)
(Continued)

(52) U.S. Cl.
CPC .......... *H04L 69/163* (2013.01); *H04L 47/193* (2013.01); *H04L 67/28* (2013.01); *H04L 69/24* (2013.01); *H04W 80/06* (2013.01)

(58) Field of Classification Search
None
See application file for complete search history.

(56) References Cited

U.S. PATENT DOCUMENTS 7,698,453 B2 * 4/2010 Samuels ................ H04L 67/28
709/234
8,320,250 B2 * 11/2012 Speight ................ H04W 80/06
370/235

(Continued)

FOREIGN PATENT DOCUMENTS

WO    2016137463 A1    9/2016

OTHER PUBLICATIONS

Briscoe, Ed. B., et al., "Low Latency, Low Loss, Scalable Throughput (L4S) Internet Service: Architecture", Transport Area Working Group; Internet-Draft, Mar. 30, 2017, pp. 1-34.
(Continued)

*Primary Examiner* — Tri H Phan
(74) *Attorney, Agent, or Firm* — Murphy, Bilak & Homiller, PLLC

(57) ABSTRACT

There is a provided herein a proxy at a border between two transport domains, the proxy arranged to deliver packets to a communications device in a first transport domain; the packets received from a server in a second transport domain. The proxy is arranged to: receive a packet from the server, the packet directed to the communications device; and forward the packet to the communications device and reply to the server with a traffic handling offer message, the traffic handling offer message including a plurality of traffic handling options. The proxy is further arranged to receive a selection of a traffic handling option from the server; and apply the selected traffic handling option to packets sent from the server to the communications device via the proxy.

18 Claims, 6 Drawing Sheets

(51) Int. Cl.
*H04W 80/06* (2009.01)
*H04L 12/801* (2013.01)

(56) References Cited

U.S. PATENT DOCUMENTS

| | | | | |
|---|---|---|---|---|
| 9,596,299 | B2* | 3/2017 | Yengalasetti | ....... H04L 67/1031 |
| 10,165,055 | B2* | 12/2018 | Singhal | ................... H04L 63/10 |
| 10,616,185 | B2* | 4/2020 | Mihaly | ............... H04L 47/2441 |
| 11,088,957 | B2* | 8/2021 | Nadas | ..................... H04L 47/25 |
| 11,095,688 | B2* | 8/2021 | Chauhan | ............. G06F 21/6263 |
| 2009/0201813 | A1 | 8/2009 | Speight | |
| 2015/0006625 | A1* | 1/2015 | Lee | ......................... H04L 47/25 |
| | | | | 709/203 |
| 2016/0183101 | A1 | 6/2016 | Major et al. | |

OTHER PUBLICATIONS

Dong, Mo, et al., "PCC: Re-architecting Congestion Control for Consistent High Performance", Oct. 11, 2014, pp. 1-14.

Jain, A., et al., "Mobile Throughput Guidance Inband Signaling Protocol draft-flinck-mobile-throughput-guidance-04.txt", Internet Engineering Task Force; Internet-Draft, Sep. 14, 2017, pp. 1-16.

Quinn, Ed. P., et al., "Network Service Header", Service Function Chaining; Internet-Draft, Feb. 23, 2017, pp. 1-37.

Trammell, B., "Path Layer UDP Substrate Specification", Network Working Group; Internet-Draft, Dec. 23, 2016, pp. 1-13.

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.3.0, Jun. 2017, pp. 1-331.

Unknown, Author, "Method for In-band Meta-data Transfer", Research Disclosure database No. 623051; The Industry Standard Disclosure Publication Service, Feb. 18, 2016, pp. 1-6.

You, J., et al., "Latency Loss Tradeoff PHB Group", Tsvwg Working Group; Internet-Draft, Mar. 13, 2016, pp. 1-12.

* cited by examiner

Proxy:

Server:

DATA TRANSMISSION IN WIRELESS COMMUNICATIONS NETWORKS

TECHNICAL FIELD

The present application relates to a proxy, a method in a proxy, a server, a method in a server, and a computer readable medium.

BACKGROUND

The performance of the Internet may be measured with metrics such as latency and bandwidth as measured on a particular connection or group of connections. This performance is highly dependent upon the transport protocols operating across the whole network between any connection between a source and a destination endpoint. TCP (Transport Control Protocol) is the dominant transport protocol used in the internet. This provides reliable and efficient end-to-end communication in fixed networks, which are sometimes referred to as wired networks.

However, while TCP was designed for and performs well in fixed networks, today's Internet has a significant portion in the mobile domain. This is due to the popularity of smartphones, tablets, etc. which are often connected to the global Internet via a wireless communications network. A wireless communication network may be a cellular network, and may use any of the 2G-5G network standards.

In contrast to a fixed network, the mobile data transmission provided by a wireless communication network often exhibits different characteristics for which TCP was not designed and which may adversely impact the TCP performance in such a network. For example, TCP uses packet losses as an indicator of congestion in the network. However, packet losses on wireless links are not exclusively an indicator of a congestion event but may be due to channel bit errors. Equating a packet loss on a wireless link with a congestion event causes TCP to perform poorly over wireless networks.

Further a wireless communications network is likely to experience packet losses during mobile terminal handovers and the reordering of packets when multilink access is used. Both of these are non-congestion events typical for mobile networks which may be interpreted as congestion by TCP and so degrade the TCP performance in a wireless communications network.

A popular approach to handle non-congestion losses when using TCP in a wireless communications network is to apply a reliable data link-layer protocol. This solution hides the link losses from the transport protocol by using mechanisms such as link retransmissions and Forward Error Correction (FEC), for example. A wireless communications network may implement such internal retransmission loops, like the RLC AM and PDCP retransmission. Further, cell handover procedures may include packet buffering at the old base station and forwarding to the new base station in order to reduce packet losses during mobile handover.

For example, 3GPP TR 36.300 (v 14.3.0, July 2017) is titled Evolved Universal Terrestrial Radio Access (E-UTRA) and Evolved Universal Terrestrial Radio Access Network (E-UTRAN); Overall description; Stage 2. This gives a description of PDCP retransmission at section 6.3, and a description of RLC retransmission at section 10.1.2.3.

Another problem is that the radio access bandwidth available for end user devices in cellular networks can vary by an order of magnitude over a few seconds due to changes in the underlying radio channel conditions due to interference, device mobility, or changes in system load as other devices enter and leave the network. A recent internet draft (Mobile Throughput Guidance Inband Signaling Protocol, https://tools.ietf.org/html/draft-Hinck-mobile-throughput-guidance-04) proposes a mechanism and protocol elements that allow a cellular network to provide near real-time information on capacity available to the TCP server. This "Throughput Guidance" (TG) information would indicate the throughput estimated to be available at the radio downlink interface (between the RAN and the mobile device (UE)). The intention is that a TCP server could use this TG information to ensure high network utilization and high service delivery performance.

A further problem with link-layer protocols is the varying round trip time (RTT) appearing at the IP layer due to any lower-layer re-transmissions. It is thus very hard to achieve consistently low delays with a current radio access network. Providing low delays for TCP flows on the internet is a general problem that originates from the inherent TCP Congestion Control functionality that uses packet losses as indication of congestion. New TCP variants have been proposed to solve the problem (BBR, TCP Prague), but they could be suppressed by 'legacy' TCP implementations if sharing the same bottleneck queue.

There are also other proposals to achieve low packet delays for specific applications, based on the declarations from the endpoints. These declarations may be just 'one bit' flagging of packets (see reference [6]) or more verbose based on a signaling protocol (see reference [5]). However, a common problem of such open-loop solutions is that there is no information on where a certain event has occurred. For example, if there has been a packet loss because the RAN has been optimized for low-latency behavior (meaning that non-congestion losses would be preferred instead of jitter), then the server developed for such behavior would likely run a non-TCP friendly congestion control expecting such losses. However, a packet loss could still occur on the Internet domain, which would require loss-sensitive congestion control behavior at the endpoint, but the endpoint has no means to infer this.

Accordingly, there is a need for improved data transmission in wireless communications networks.

WO 2016/137463 A1 (Nokia) describes coordinated techniques to improve application, network and device resource utilization of a data stream. Information is determined affecting data presentation of part of a data stream to a user application on a user equipment, and may be energy consumption information and/or Quality of Experience (QoE) information caused at least by the data presentation. The information is sent from the user equipment toward a content server. At radio network element(s), radio timer information corresponding to data transmission of part of the data stream from a base station to a user equipment is determined and sent (e.g., possibly with the energy consumption information and/or QoE information) to other radio network elements and/or to the content server. The content server can adjust streaming strategy of the data stream based on the information received, and the radio network element(s) can perform power aware scheduling and/or radio timer adjustments based on received energy consumption information and/or the QoE information.

SUMMARY

Given the above problems there is provided herein a means whereby the traffic handling functionality in the RAN is coordinated with the server behavior. This means that legacy traffic can still be supported but also allowing for improved traffic handling between endpoints.

This document presents a method for negotiating radio access network traffic handling functionality. The negotiation is mediated by a proxy that is placed at the border between the radio access network domain (where different data packet treatment is possible) and the Internet domain. The proxy and the server negotiate desired data treatment in a client-agnostic way starting with a declarative proxy offer. Based on the result of the negotiation the proxy (re-) configures data treatment in the radio access network domain. For example, the proxy configures RCL UM and switches off ordered packet delivery while sending ACK/NACK information to the server of the packets seen at the domain border, and the Server configures a transmission protocol congestion control behavior for the radio access domain that is insensitive to packet losses/reordering.

There is a provided herein a proxy at a border between two transport domains, the proxy-arranged to deliver packets to a communications device in a first transport domain; the packets received from a server in a second transport domain. The proxy is arranged to: receive a packet from the server, the packet directed to the communications device; and forward the packet to the communications device and reply to the server with a traffic handling offer message, the traffic handling offer message including a plurality of traffic handling options. The proxy is further arranged to receive a selection of a traffic handling option from the server, and apply the selected traffic handling option to packets sent from the server to the communications device via the proxy.

Thus, the proxy is able to receive instructions from the server, informing it how to handle the traffic for that server-client connection. The server knows the transmission requirements of the data it is sending, and so it is important that the proxy has a mechanism to receive such an instruction from the server. For example, where end-to-end encryption is applied, the proxy cannot even know the nature of the traffic it is handling, the proxy described herein can this apply traffic enhancement measures even where end-to-end encryption Is employed.

The selected traffic handling option is applied to packets sent from the server to the communications device via the proxy subsequent to the selection of a traffic handling option.

The traffic handling offer message may comprise an initiation of a service offer negotiation between the server and the proxy.

There is further provided a proxy at a border between two transport domains, the proxy arranged to deliver packets to a communications device in a first transport domain; the packets received from a server in a second transport domain. The proxy is further arranged to: receive a packet from the server, the packet directed to the communications device; forward the packet to the communications device and initiate a service offer negotiation with die server; negotiate a traffic handling option with the server; and apply the traffic handling option to packets sent from the server to the communications device via the proxy.

The traffic handling options comprise at least one of: ordered packet delivery; ordered packet delivery; packet acknowledgement by the proxy; prevent layer 2 retransmissions; header-only encryption of packets in the first transport domain; or IP-address preservation at handover.

The proxy may be further arranged to receive an acknowledgement message from the communications device and forward this to the server. Alternatively, the acknowledgement may be returned via another path independent of die proxy.

The first transport domain may be a wireless communications network, and the communications device may be a wireless communications device. The second transport domain may be a wired network.

The packet received from the server awl that is forwarded to the communications device may be a transport protocol setup request.

There is further provided a method in a proxy at a border between two transport domains, the proxy arranged to deliver packets to a communications device in a first transport domain; the packets received from a server in a second transport domain. The method comprises: receiving a packet from the server, the packet directed to the communications device; and forwarding the packet to the communications device and reply to the server with a traffic handling offer message, the traffic handling offer message including a plurality of traffic handling options. The method further comprises receiving a selection of a traffic handling option from the server; and applying the selected traffic handling option to packets sent from the server to the communications device via the proxy.

The selected traffic handling option ma be applied to packets sent from the server to the communications device via the proxy subsequent to the selection of a traffic handling option.

The traffic handling offer message may comprise an initiation of a service offer negotiation between the server and the proxy.

There is further provided a method in a proxy at a border between two transport domains, the proxy arranged to deliver packets to a communications device in a first transport domain; the packets received from a send in a second transport domain, the method comprising: receiving a packet from the server, the packet directed to the communications device; forwarding the packet to the communications device and initiating a service offer negotiation with the server; negotiating a traffic handling option with the server; and applying the traffic handling option to packets sent from the server to the communications device via the proxy.

The method may further comprise receiving an acknowledgement message from the communications device and forwarding this to the server. Alternatively, the acknowledgement may be returned via another path independent of the proxy.

There is further provided a server in a second transport domain, the server arranged to send packets to a communications device in a first transport domain via a proxy. The server is further arranged to: send a packet to the proxy, the packet directed to the communications device; and receive a traffic handling offer message from the proxy, the traffic handling offer message including a plurality of traffic handling options. The server is further arranged to select of a traffic handling option; and send an indication of the selection to the proxy, wherein a selected traffic handling option is applied by the proxy to packets sent from the server to the communications device via the proxy.

Thus, the server, which knows the transmission requirements of the data it is sending, can instruct the proxy how best to deliver this data over the wireless network. Because the server is in control, the proxy does not need to know what the traffic it, and so this arrangement will work with end-to-end encryption. Further, because the server will know that the traffic enhancement is applied, it can keep performance metrics and make comparisons between no enhancement and enhanced delivery. Such metrics may educate which enhancements are selected by the server, or offered by the proxy. Further such metrics may be used to justify the intervention by the proxy.

The selected traffic handling option is applied to packets sent from the server to the communications device via the proxy subsequent to the selection of a traffic handling option.

The traffic handling offer message may comprise an initiation of a service offer negotiation between the server and the proxy.

There is further provided a server in a second transport domain arranged to send packets to a communications device in a first transport domain via a proxy at the border between the two transport domains, the server further arranged to: send a packet to the proxy, the packet directed to the communications device; receive an invitation to negotiate a service offer with the proxy; negotiate a traffic handling option with the proxy, wherein a selected traffic handling option is applied by the proxy to packets sent from the server to the communications device via the proxy The server may be further arranged to receive an acknowledgement message from the communications device via the proxy. Alternatively, the acknowledgement may be returned via another path independent of the proxy.

There is further provided a method in a server in a second transport domain, the server arranged to send packets to a communications device in a first transport domain via a proxy. The method comprises: sending a packet to the proxy, the packet directed to the communications device; and receiving a traffic handling offer message from the proxy, the traffic handling offer message including a plurality of traffic handling options. The method further comprises selecting of a traffic handling option; and sending an indication of the selection to the proxy, wherein a selected traffic handling option is applied by the proxy to packets sent from the server to the communications device via the proxy.

The selected traffic handling option is applied to packets sent from the server to the communications device via the proxy subsequent to the selection of a traffic handling option. The traffic handling offer message comprises an initiation of a service offer negotiation between the server and the proxy.

There is further provided a method in a server in a second transport domain arranged to send packets to a communications device in a first transport domain via a proxy at the border between the two transport domains, the method comprising: sending a packet to the proxy, the packet directed to the communications device; receiving an invitation to negotiate a service offer with the proxy; negotiating a traffic handling option with the proxy, wherein a selected traffic handling option is applied by the proxy to packets sent from die server to the communications device via the proxy The method may further comprise receiving an acknowledgement message from the communications device via the proxy. Alternatively, the acknowledgement may be returned via another path independent of the proxy. The packet sent to the communications device via the proxy may be a transport protocol setup request.

There is further provided a proxy for improved data transmission in a wireless communications network, the proxy at a border between two transport domains, the proxy arranged to deliver packets to a communications device in the wireless communications network, the packets receive from a server in a second transport domain, the proxy comprising a processor and a memory, said memory containing instructions executable by said processor. The proxy is operative to: receive a packet from the server, the packet directed to the communications device; forward the packet to the communications device and reply to the server with a traffic handling offer message, tire traffic handling offer message including a plurality of traffic handling options; receive a selection of a traffic handling option from the server, and apply the selected traffic handling option to packets sent from the server to the communications device via the proxy.

There is further provided a server for improved data transmission in wireless communications networks, the server in a second transport domain and arranged to send packets to a communications device in a first transport domain via a proxy, the server comprising a processor and a memory, said memory containing instructions executable by said processor. The server is operative to: send a packet to die proxy, the packet directed to the communications device; receive a traffic handling offer message from the proxy, the traffic handling offer message including a plurality of traffic handling options; select a traffic handling option; and send an indication of the selection to the proxy, wherein a selected traffic handling option is applied by the proxy to packets sent from the server to the communications device via the proxy.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

BRIEF DESCRIPTION OF THE DRAWINGS

A method and apparatus for improved data transmission in wireless communications networks wall now be described, by way of example only, with reference to the accompanying drawings, in which.

DETAILED DESCRIPTION

In this detailed description, numerous specific details are set forth in order to provide a thorough understanding of the embodiments of the invention. It will be understood by those skilled in the art, however, that the embodiments of the invention may be practiced without these specific details. In other instances, well known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors mace by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor.

Alternatively, an embodiment of the invention may be implemented as specific hardware components that contain hard wired logic for performing the recited functionality, or by any combination of programmed general-purpose computer components and custom hardware components.

Figure 1:
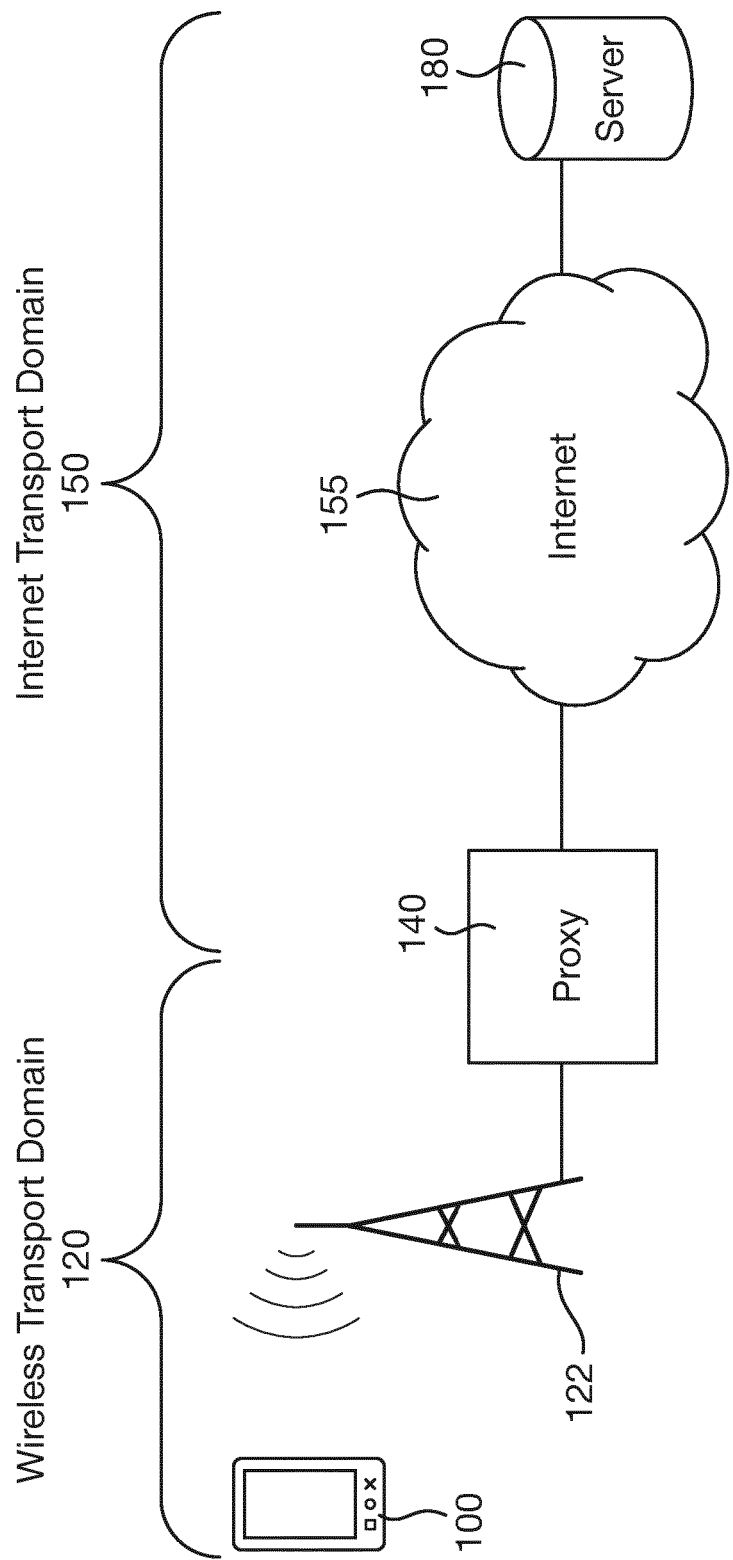
FIG. 1 illustrates a data transmission path between a communications device and a server.

Referring now in detail to the drawings there is illustrated in FIG. 1 a data transmission path between a communications device 100 and a server 180. The communications device 100 sits within the wireless transport domain 120 whereas the server sits in the internet transport domain 150. The communications device 100 is illustrated as a smartphone and connects to a wireless communications network 122 via radio transmissions to a base station. A proxy 140 operates at the border between the wireless transport domain 120 and the internet transport domain 150. Proxy 140 communicates with server 180 over the internet 155.

In operation, packets of data travel through the internet 155 using the transmission control protocol (TCP), and in prior art solutions TCP is also used in the wireless transport domain 120.

Figure 2:
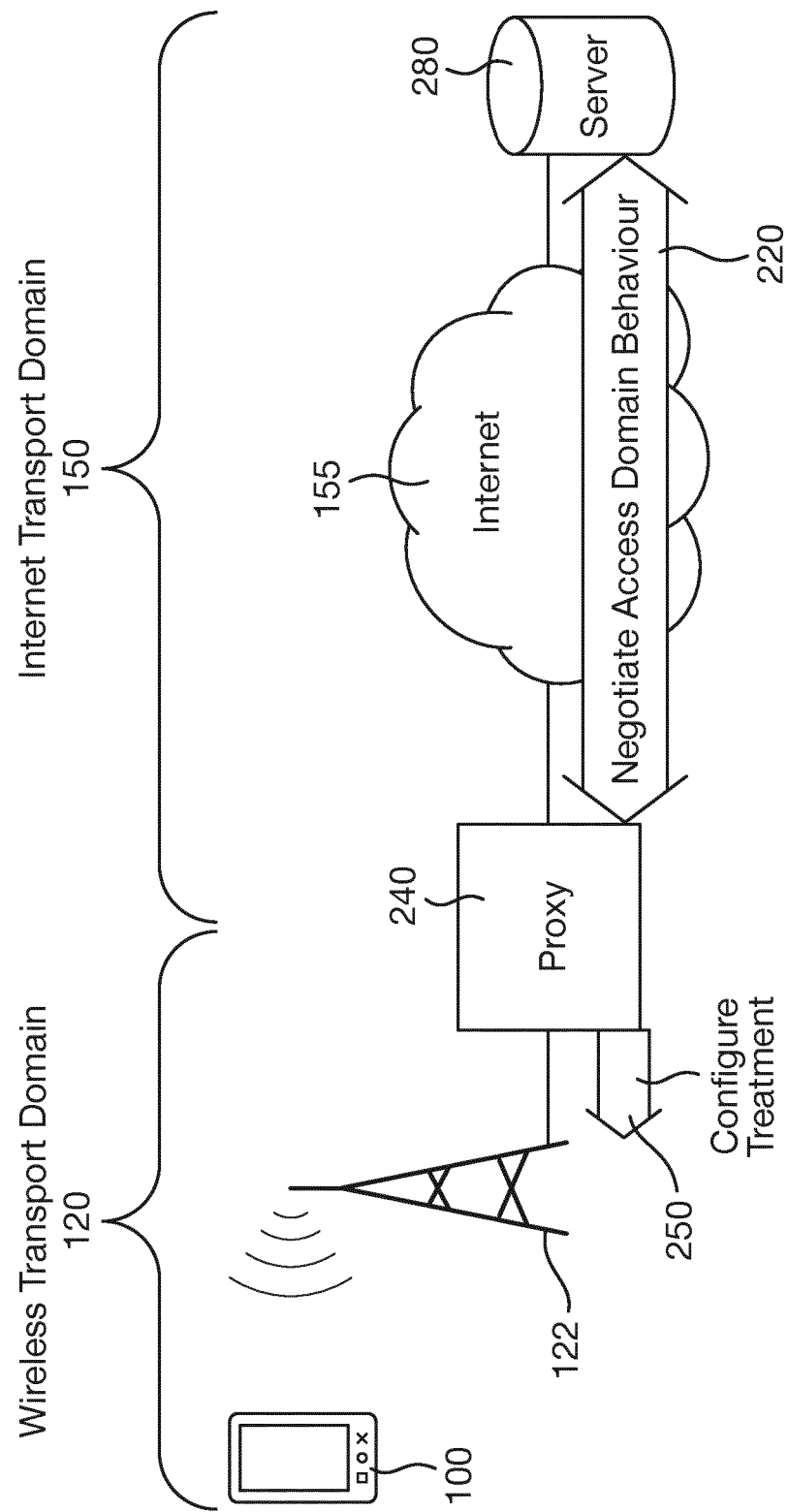
FIG. 2 illustrates the basic concept disclosed herein.

FIG. 2 illustrates the basic concept disclosed herein. A modified proxy 240, is placed at the domain border between the two domains. The proxy 240 may be referred to as a performance enhancing proxy (PEP). The proxy 240 negotiates 220 data treatment in the wireless transport domain 120 with the server 280 and then it configures 250 the corresponding treatment in the radio access network 122.

In operation, the proxy 240 provides a method for negotiating radio access network traffic handling functionality. The negotiation is mediated by the proxy 240 which is placed at the border between the radio access network domain 120 (where different data packet treatment is possible) and the Internet domain 150. The proxy 240 and the server 280 negotiate desired data treatment in a client-agnostic way starting with a declarative proxy Offer. Based on the result of the negotiation the proxy 240 (re-)configures data treatment in the radio access network domain. The server 280 may also (re-)configure its data sending logic. For example, the proxy 240 configures RCL UM and switches off ordered packet deliver while sending ACK/NACK information to the server 280 of the packets seen at the domain border, and the server 280 configures a transmission protocol congestion control behavior for the radio access domain that is insensitive to packet losses/reordering.

The negotiation mediated by the proxy allows a server to optimize traffic delivery across both the internet and wireless network domains. The traffic optimization can be selected by the server dependent upon the characteristic of the traffic it is transmitting. Thus, the proxy is able to receive instructions from the server, informing it how to handle the traffic for that server-client connection. The server knows the transmission requirements of the data it is sending, and so it is important that the proxy has a mechanism to receive such an instruction from the server. For example, where end-to-end encryption is applied, the proxy cannot even know the nature of the traffic it is handling, the proxy described herein can this apply traffic enhancement measures even where end-to-end encryption is employed.

Figure 3:
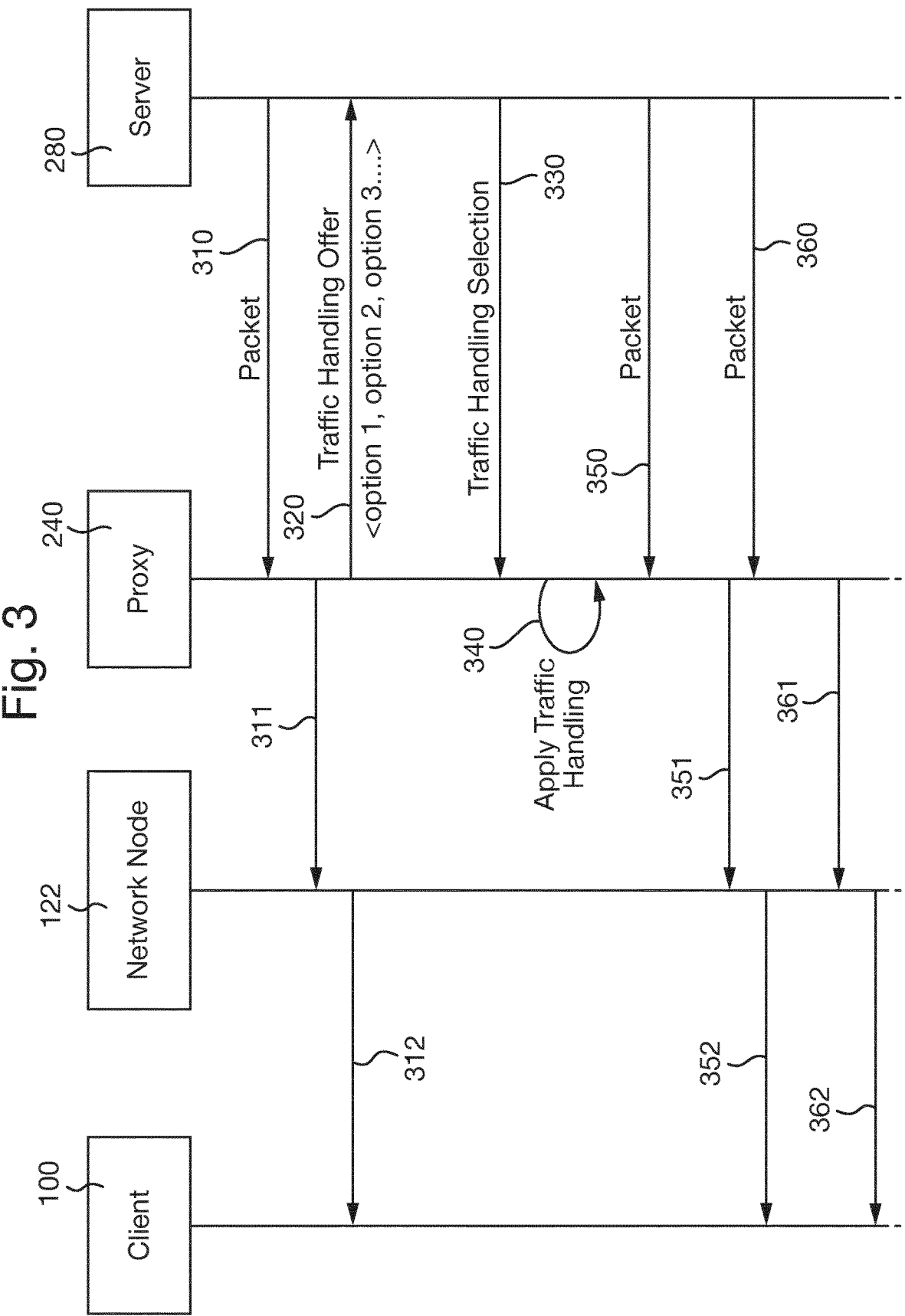
FIG. 3 is a signaling diagram illustrating a method in a proxy at a border between two transport domains.

FIG. 3 is a signaling diagram illustrating a method in a proxy 240 at a border between two transport domains, the proxy 240 arranged to deliver packets to a communications device 100 in a first transport domain; the packets received from a server 280 in a second transport domain. The method comprises: receiving 310 a packet from the server 280, the packet directed to the communications device 100; and forwarding 311, 312 the packet to the communications device 100 and replying to the server 280 with a traffic handling offer message 320, the traffic handling offer message including a plurality of traffic handling options. The method further comprises receiving 330 a selection of a traffic handling option from the server 280; and applying 340 the selected traffic handling option to packets sent 350, 300 from the server 280 to die communications device 100 via the proxy 240. FIG. 3 additionally shows a network node 122 which receives packets 311, 351, 361 from the proxy 240 and passes these 312, 352, 362 to the communications device 100.

The selected traffic handling option may be applied to packets sent from the server to the communications device via the proxy, this is done subsequent to the selection of a traffic handling option. The traffic handling offer message may comprise an initiation of a service offer negotiation between die server and the proxy.

Figure 4:
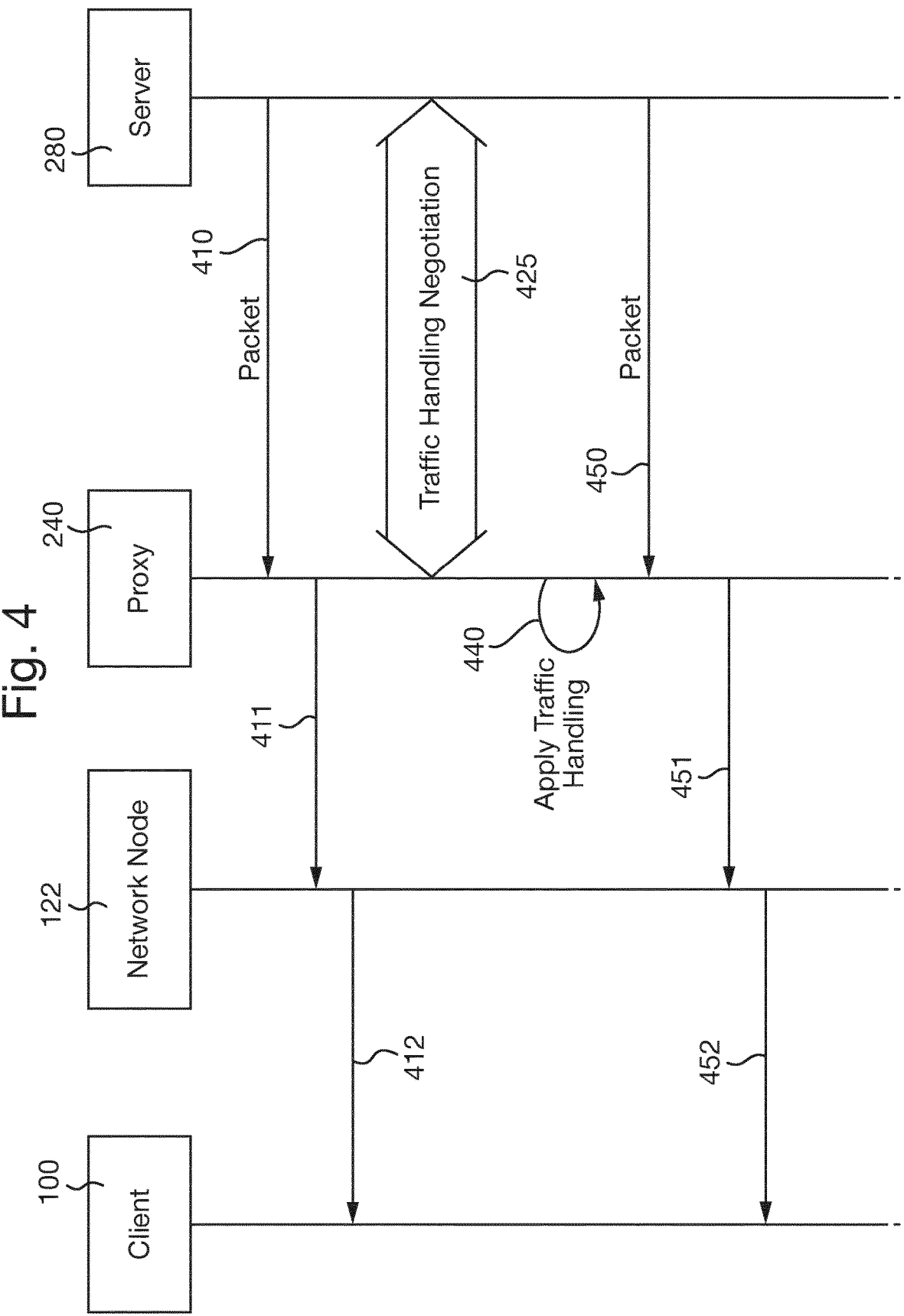
FIG. 4 is a signaling diagram illustrating an alternative method in a proxy at a border between two transport domains.

FIG. 4 is a signaling diagram illustrating an alternative method in a proxy 240 at a border between two transport domains, the proxy 240 arranged to deliver packets to a communications device 100 in a first transport domain; the packets received from a server 280 in a second transport domain, the method comprising: receiving 410 a packet from the server, the packet directed to the communications device; forwarding 411, 412 the packet to the communications device 100 and initiating a service offer negotiation with the server 280; negotiating 425 a traffic handling option with the server 280; and applying 440 the traffic handling option to packets sent 450 from the server 280 to the communications device 100 via the proxy 240.

The method may further comprise receiving an acknowledgement message from the communications device and forwarding this to the server. Alternatively, the acknowledgement may be returned via another path independent of the proxy.

Figure 5:
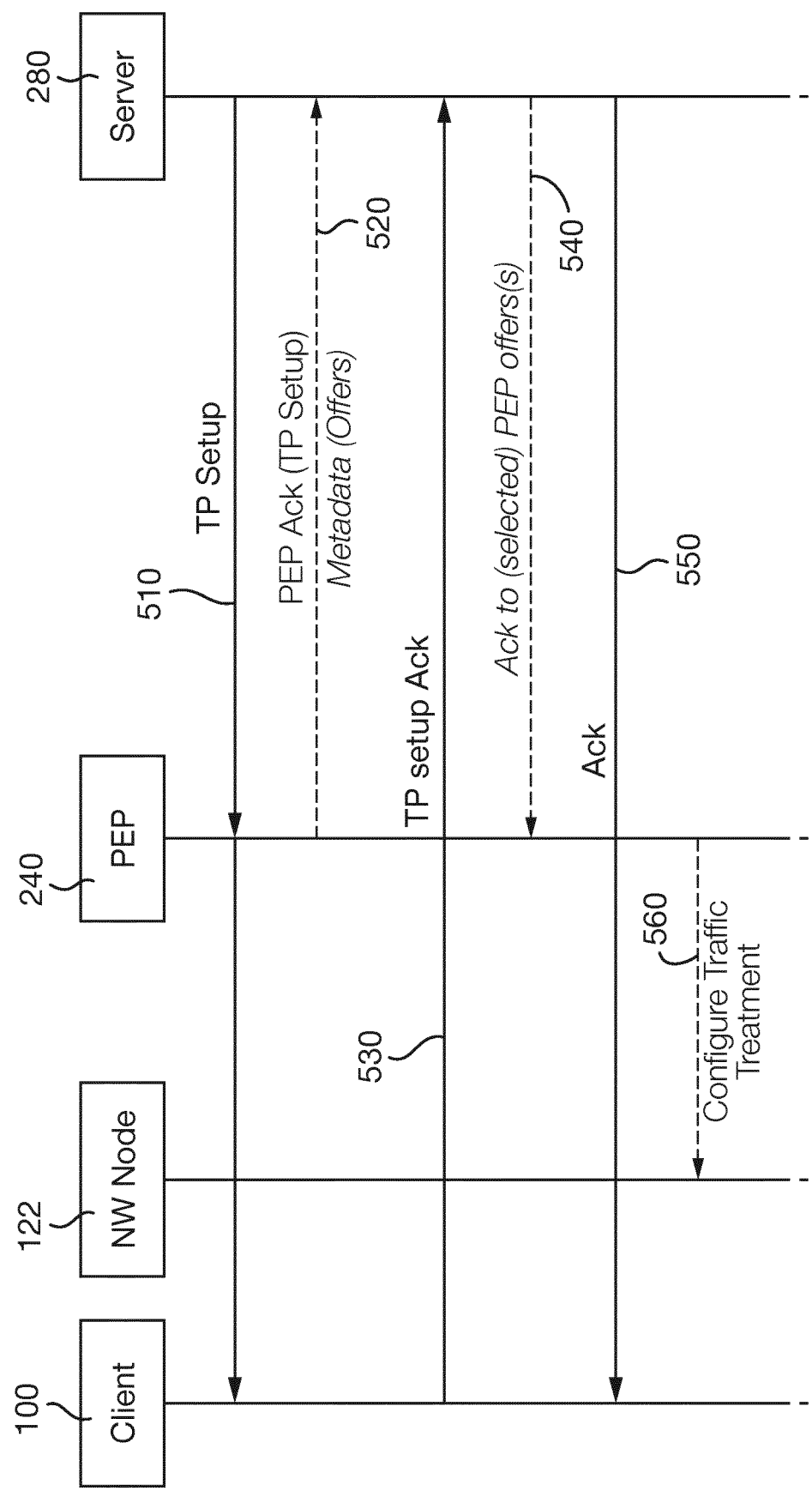
FIG. 5 is another signaling diagram showing a further example of a communication sequence.

FIG. 5 is another signaling diagram showing a further example of a communication sequence. This example assumes that the negotiation happens during the transport protocol connection setup (Steps 510, 530, 550), but in principle this may take place at any time during the lifetime of the connection, e.g., when a first packet with previously not seen 5-tuple is received by the performance enhancing proxy PEP 240 (e.g., after a handover to a new RBS with different capabilities).

Upon receipt of the transport protocol setup message 510 intended for the client device 100, the PEP 240 informs 520 the server 280 about the different service options. This message 520 may be referred to as a PEP message and there are multiple ways of how to send these. Here, the PEP message is appended as meta-data to a separate PEP ACK message 520 sent in response to the transport protocol setup message from the server 280. The server 280 then sends an acknowledgment message 540 to the PEP 240 to accept the PEP offer.

In an alternative arrangement the offer is sent appended to the TP setup ACK 530, and the acknowledgment appended to an existing packet such as acknowledgment 550 to the PEP.

The explicit accept from the server enables the proxy to initiate the orchestration of the radio access network protocol stack accordingly, as discussed below. In this example, the PEP 240 configures 560 a traffic treatment for traffic to the client 100.

There is further provided a method in a server in a second transport domain, the server arranged to send packets to a communications device in a first transport domain via a proxy. With reference to FIG. 3 this method comprises: sending a packet 310 to the proxy 240, the packet directed to the communications device 100; and receiving a traffic handling offer message 320 from the proxy 240, the traffic handling offer message 320 including a plurality of traffic handling options. The method further comprises selecting a traffic handling option; and sending an indication 330 of the selection to the proxy 240, wherein a selected traffic handling option is applied 340 by the proxy 240 to packets sent from the server 280 to the communications device 100 via the proxy 240.

The selected traffic handling option is applied to packets sent from the server 280 to the communications device 100 via the proxy 240 subsequent to the selection 330 of a traffic handling option. The traffic handling offer message 320 comprises an initiation of a service offer negotiation between the server 280 and the proxy 240.

Thus, the server which knows the transmission requirements of the data it is sending, can instruct the proxy how best to deliver this data over the wireless network. Because the server is in control, the proxy does not need to know what the traffic it, and so this arrangement will work with end-to-end encryption. Further, because die server will know that the traffic enhancement is applied, it can keep performance metrics and make comparisons between no enhancement and enhanced delivery. Such metrics may educate which enhancements are selected by the server, or offered by the proxy. Further such metrics may be used to justify the intervention by the proxy.

There is further provided a method in a server in a second transport domain arranged to send packets to a communications device in a first transport domain via a proxy at the border between the two transport domains. With reference to FIG. 4, this method comprises: sending 410 a packet to the proxy 240, the packet directed to the communications device 100; receiving an invitation to negotiate a service offer with the proxy; negotiating 425 a traffic handling option with the proxy, wherein a selected traffic handling option is applied 440 by the proxy 240 to packets 450 sent from the server 280 to the communications device 100 via die proxy 240.

The method may further comprise receiving an acknowledgement message from the communications device via the proxy. Alternatively, the acknowledgement may be returned via another path independent of the proxy. The packet sent to the communications device via the proxy may be a transport protocol setup request.

The following paragraphs give some examples of service options which may be negotiated between the proxy (PEP) and the server. All network features mentioned below represent functionality that is available in a radio access networks (RANs) today. As radio access networks are further developed and enhanced, more functionality will be possible and offered in the legitimatization. Note that it is possible that the result of the negotiation is the removal of an unnecessary radio access network operation. Thus, a benefit from the arrangements described herein is that radio access network operation is simplified for the particular connection.

While some of the below described techniques are already known, their real-world application is severely limited by the requirement for backwards compatibility within a modern internet protocol network. The methods and apparatus described herein allow these techniques to lie more readily applied, to specific server client connections, allowing performance enhancement for those connections while ensuring legacy equipment can still operate.

Unordered vs Ordered Packet Delivery

Currently there are mechanisms in RLC and PDCP of radio access networks that ensure in sequence delivery of packets to a client. This is necessary since many of the current TCP flavours are sensitive to packet re-ordering; such that packet re-ordering causes degraded performance. However, there is also a mechanism proposed for TCP (and QUIC), called RACK (Recent ACK), that makes die TP much more resilient to packet re-ordering. This means that a server that uses these varieties of TCP flavours may see a performance enhancement by selecting unordered packet delivery in the radio access network.

Sending Packet ACKs by the PEP

The PEP could offer to send separate ACKs (acknowledgements) on all server packets that are 'seen' by the PEP. This allow's the use of a more efficient multi-domain congestion control mechanism by the server, enabling for faster adaptation to bandwidth fluctuations in the radio domain. It also allows for a TCP-friendly end-to-end transport protocol operation in the Internet domain also when non-congestion losses occur in the radio access network.

To facilitate sending ACKs by the proxy, die network should be configured such that the PEP can receive new connection setup packets or data packets from the connection (e.g., after a hand over), thus it could also send ACKs or NACKs in response to packets received from server. This feedback enables the server to identify where the packet loss has happened: if a packet is ACKed from the PEP and not ACKed from the client then it was lost in the domain below the PEP, i.e. the access domain, if a packet is not ACKed from either the PEP and the client then it was lost on the Internet (i.e. between the PEP and the server). The server can then apply a multi-domain congestion control that Lakes into account this additional information to improve the overall end-to-end performance.

Layer 2 Retransmissions vs Non-Congestion Losses

An unwanted effect of a mechanism for lower-layer re-transmissions in a radio access network is that this gives a varying RTT for packets appearing at the IP layer. There are congestion control algorithms that are insensitive to non-congestion losses [1], and although not necessarily TCP-fair, they are still are applicable if resource sharing is applied in the given domain. The applications that require deterministic delays and implement similar CC thus can choose to switch off some lower-layer retransmissions in the radio access network. That is deactivate RLC AM retransmissions and apply RLC UM instead.

Note that this functionality should preferably be used together with sending packet ACKs by the PEP (as described above) in order that the server can distinguish between the packet losses in die RAN and packet losses in the Internet domains and thus provide a TCP-fair behavior in the Internet domain.

Encryption vs Plain Packet Delivery in RAN

Wireless access networks apply encryption to prevent unauthorized access to data and thus to protect data integrity and confidentiality. However, pervasive end-to-end encryption such as TLS currently used by many applications and even some transmission protocols (such as QUIC) makes this radio access network feature redundant, at least for the payload. Titus, the server and proxy may negotiate no or header-only encryption in the radio access network. The advantage for an application using the connection would be further network latency reduction.

Seamless vs Non-Seamless Handover

Some applications can cope with an occasional client IP address change, furthermore, some applications are now multi-host aware/capable. This reduces the need for supporting mobility with IP address preservation. The benefit for an application using the connection is lower latency because the paths may be always kept optimal.

The above are some examples of traffic handling options that may be applied within the framework of the disclosed methods and apparatus. The above list is not exhaustive.

Typically, a proxy forwards packets from the server to a client device and does not communicate directly with the server. Here, the proxy and the server communicate directly so as to negotiate traffic handling. The proxy and the server communication can be achieved by application of on-path Middlebox Cooperation Protocols, e.g., PLUS as described in reference [5]. These protocols provide standardized information to middleboxes (such as a proxy) and allow the middleboxes to send declarative, incrementally useful information. Since these are substrate layer protocols, they also support information being appended to an existing client-server packet.

If such a protocol is not supported, then the negotiation information may be also sent in a proprietary way by using the 5-tuple of the original connection. The message can be prepared in such a way that it will be ignored or dropped if received by a node not supporting the protocol. More details on how to achieve such an on-path metadata transfer for different TPs may be found in reference [8].

Based on the negotiation results, the wireless transport domain will treat the packets of a given connection differently, as compared to standard packets. It is the role of the proxy to configure this behaviour.

One possibility is that the PEP 'steers' the proper functionality of the radio access network through some APIs. In the current 3GPP architecture, the proxy can act as a Traffic Detection Function (TDF) reporting the "detected" traffic type to PCRF (Policy and Charging Rules Function) based on which the PCRF may instruct the PDN GW (packet data network gateway) redirect the traffic of the given connection to a specific bearer with die required radio access network functionality. Alternatively, the proxy functionality may be part of the PDN GW functionality, making possible the classification directly at the PDN GW, i.e., without involving a PCRF. This solution assumes multiple bearers with different functionality to the same UE: one bearer resembling current best-effort bearer functionality and others with simplified functionality. Note that die bearer(s) with the simplified functionality (e.g., a bearer with RLC-UM) has to be setup only in the case when a connection negotiates the corresponding treatment (and the connection may use the other bearer with RLC-AM while this new bearer is being set up).

If the network operates according to the Service Function Chaining (SFC) paradigm, then the traffic treatment could be based on Network Service Headers (NSH) as described in reference [4]. NSH is a transport independent data-plan header that contains path identification information needed to realize a service path. Acting as the ingress packet classifier, the PEP (configured with proper packet classification policies) inserts an NSH that has information about the needed service path (i.e., the set of needed service functions) for the given packet. In this case, the different service paths may be defined by excluding one of more SFs from the original "best-effort" path.

An alternative solution is that, instead of a PEP-RAN API to steer the needed RAN treatment, the RAN always operates with the simplest functionality (i.e., the smallest set of functions that are needed to handle the connection), and the PEP supplements the required extra functionality based on the result of the negotiation. For example, the RAN always operates in an RFC UM mode, and PEP adds the retransmission functionality that is needed to avoid non-congestion losses by unsuccessful MAC-layer retransmissions for those connections that assume congestion losses only (e.g., legacy TCP). This PEP functionality may be implemented in two ways:

For non-encrypted TCP, the PEP could use split TCP with a congestion control on the radio leg that supports non-congestion losses.

For encrypted TCP, the RCL AM functionality is moved to the PEP; the advantage of this scheme is that the PEP could apply a congestion control also for the RLC retransmissions.

To implement the above described methods a new proxy and a new server are presented.

There is a provided herein a proxy at a border between two transport domains, the proxy arranged to deliver packets to a communications device in a first transport domain; the packets received from a server in a second transport domain. The proxy is arranged to: receive a packet from the server, the packet directed to the communications device; and forward the packet to the communications device and reply to the server with a traffic handling offer message, the traffic handling offer message including a plurality of traffic handling options. The proxy is further arranged to receive a selection of a traffic handling option from the server, and apply the selected traffic handling option to packets sent from the server to the communications device via the proxy.

The selected traffic handling option is applied to packets sent from the server to the communications device via the proxy subsequent to the selection of a traffic handling option.

The traffic handling offer message may comprise an initiation of a service offer negotiation between the server and the proxy.

There is further provided a proxy at a border between two transport domains, the proxy arranged to deliver packets to a communications device in a first transport domain; the packets received from a server in a second transport domain. The proxy is further arranged to: receive a packet from die server, the packet directed to the communications device; forward the packet to the communications device and initiate a service offer negotiation with the server; negotiate a traffic handling option with the server; and apply the traffic handling option to packets sent from the server to the communications device via the proxy.

The traffic handling options comprise at least one of: unordered packet delivery; ordered packet delivery; packet acknowledgement by the proxy; prevent layer 2 retransmissions; header-only encryption of packets in the first transport domain; or IP-address preservation at handover.

The proxy may be further arranged to receive an acknowledgement message from the communications device anti forward this to the server. Alternatively, the acknowledgement may be returned via another path independent of the proxy.

The first transport domain may be a wireless communications network, and the communications device may be a wireless communications device. The second transport domain may be a wired network.

The packet received from the server and that is forwarded to the communications device may be a transport protocol setup request.

There is further provided a server in a second transport domain, the server arranged to send packets to a communications device in a first transport domain via a proxy. The server is further arranged to: send a packet to the proxy, the packet directed to the communications device; and receive a traffic handling offer message from the proxy, the traffic handling offer message including a plurality of traffic handling options. The server is further arranged to select of a traffic handling option; and send an indication of the selection to the proxy, wherein a selected traffic handling option is applied by the proxy to packets sent from the server to the communications device via the proxy.

The selected traffic handling option is applied to packets sent from the server to the communications device via the proxy subsequent to the selection of a traffic handling option.

The traffic handling offer message may comprise an initiation of a service offer negotiation between the server and the proxy.

There is further provided a server in a second transport domain arranged to send packets to a communications device in a first transport domain via a proxy at the border between the two transport domains, the server further arranged to: send a packet to the proxy, the packet directed to the communications device; receive an invitation to negotiate a service offer with the proxy; negotiate a traffic handling option with the proxy, wherein a selected traffic handling option is applied by the proxy to packets sent from the server to the communications device via the proxy The server may be further arranged to receive an acknowledgement message from the communications device via the proxy. Alternatively, the acknowledgement may lie returned via another path independent of the proxy.

Figure 6:
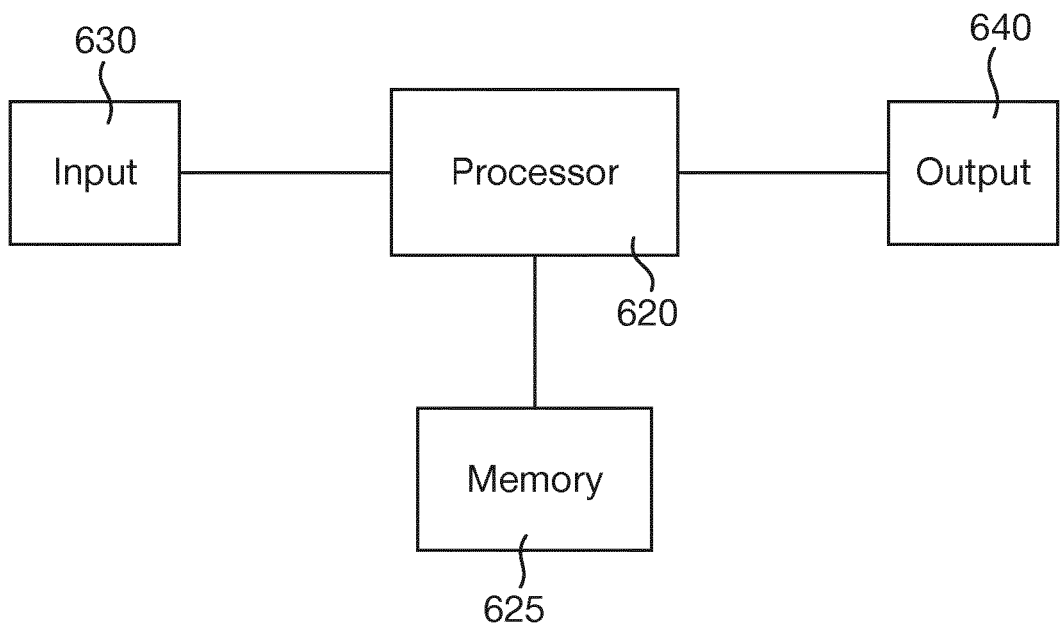
FIG. 6 illustrates a proxy for improved data transmission in a wireless communications network.

FIG. 6 illustrates a proxy for improved data transmission in a wireless communications network. The proxy comprises a processor 620, a memory 625, an input 630 and an output 640. The proxy is arranged to operate a border between two transport domains, the proxy further arranged to deliver packets to a communications device in the wireless communications network, the packets received from a server in a second transport domain, the proxy comprising a processor 620 and a memory 625, said memory 625 containing instructions executable by said processor. The proxy is operative to: receive a packet front the server, the packet directed to die communications device; forward the packet to the communications device and reply to the server with a traffic handling offer message, the traffic handling offer message including a plurality of traffic handling options; receive a selection of a traffic handling option from the server; and apply the selected traffic handling option to packets sent from the server to the communications device via the proxy.

Figure 7:
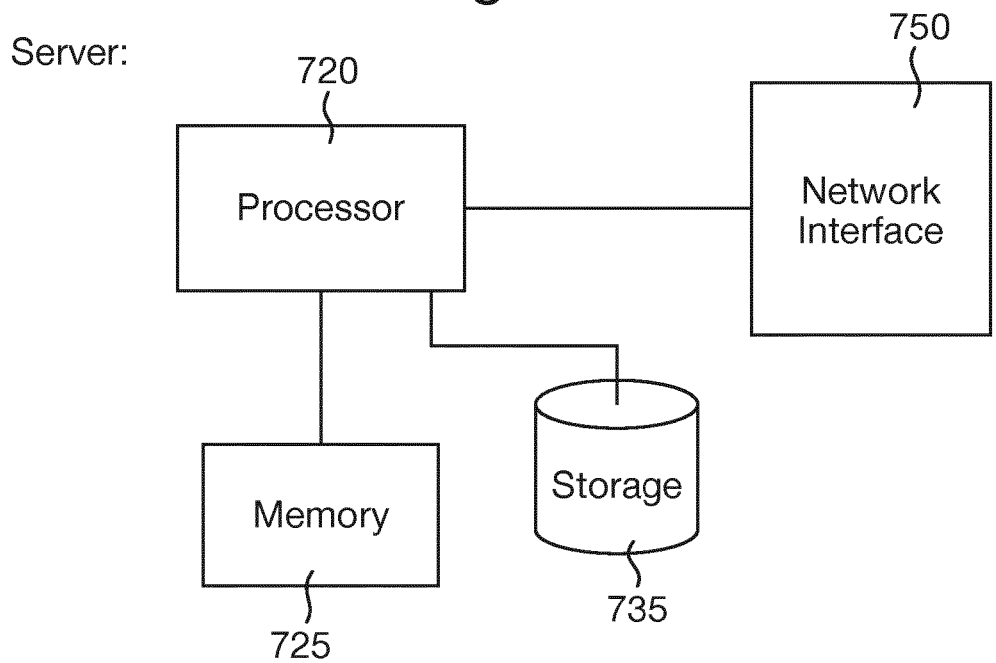
FIG. 7 illustrates a server for improved data transmission in wireless communications networks.

FIG. 7 illustrates a server for unproved data transmission in wireless communications networks. The server comprises a processor 720, memory 725, storage 735 and network interface 750. The server is arranged to operate in a second transport domain and arranged to send packets to a communications device in a first transport domain via a proxy, the server comprising a processor and a memory, said memory containing instructions executable by said processor. The server is operative to: send a packet to the proxy, the packet directed to the communications device; receive a traffic handling offer message from the proxy, the traffic handling offer message including a plurality of traffic handling options; select a traffic handling option; and send an indication of the selection to the proxy, wherein a selected traffic handling option is applied by the proxy to packets sent from the server to the communications device via the proxy.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a desk drive or a RAM (Random-access memory).

The solution presented herein has the following advantages.

It can align the radio access network and transport function functionality to be optimized for different application characteristics. For example, using small buffers and RLC UM and therefore providing low packet delays and low packet jitter for latency-sensitive applications It enables for simplification of radio access network functionality in the cases when the transmission protocol or proxy implement some mechanisms that are otherwise duplicated in the radio access network.

It provides an observable separation of the radio access domain behavior from die Internet domain behavior to the endpoints, enabling informed server decisions. This makes it possible to, for example, operate an L4S architecture in the Internet domain (which, together with die negotiated RAN behavior may result in a true end-to-end low-delay behavior). This also enables the server to use the dynamically changing radio capacity more efficiently through sending Ack/Nack information to the Server of the packets seen at domain border, thus eliminating the need for mobile throughput guidance.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The method may also be embodied in a set of instructions, stored on a computer readable medium, which when loaded into a computer processor, Digital Signal Processor (DSP) or similar, causes the processor to carry out the hereinbefore described communication method.

Equally, the method may be embodied as a specially programmed, or hardware designed, integrated circuit which operates to carry out the method on video data loaded into the said integrated circuit. The integrated circuit may be formed as part of a general purpose computing device, such as a PC, and the like, or it may be formed as part of a more specialized device, such as a games console, mobile phone, portable computer device or hardware video encoder.

The client device may be a user apparatus. The client device may be any kind of personal computer such as a television, a smart television, a set-top box, a games-console, a home-theatre personal computer, a tablet, a smartphone, a laptop, or even a desktop PC.

Further, while examples have been given in the context of particular communications standards, these examples are not intended to be the limit of the communications standards to which the disclosed method and apparatus may be applied. For example, while specific examples have been given in the context of WCDMA, the principles disclosed herein can also be applied to an LTE system, other wireless communication system, and indeed any communication system which uses a wireless network for transmission of data.

REFERENCES

[1] Mo Dong, et. al.: PCC: Re-architecting Congestion Control for High Performance (Version 3), http://arxiv.org/pdf/1409.7092v3.pdf
[2] Mobile Throughput Guidance Inband Signaling Protocol, https://tools.ietf.org/html/draft-flinck-mobile-throughput-guidance-04
[3] Low Latency, Low Loss, Scalable Throughput (L4S) Internet Service: Architecture, https://tools.ietf.org/html/draft-briscoe-tsvwg-l4s-arch-02
[4] Network Service Header, https://tools.ictf.org/html/draft-ictf-sfc-nsh-12
[5] Path Layer UDP Substrate Specification, https://tools.ietf.org/html/draft-trammell-plus-spec-00
[6] Loss/Latency tradeoff, ACCORD BoF IETF 95, https://www.ietf.org/proccedings/95/slides/slides-95-accord-1.pdf https://tools.ietf.org/html/draft-you-tsvwg-latency-loss-tradeoff-00
[8] Method for in-band meta-data transfer, research disclosure, http://hsnlab.tmit.bme.hu/~molnar/files/RD623051_meta-data_over_legacy.pdf

The invention claimed is:

1. A proxy, comprising a processor and a memory, said memory containing instructions executable by said processor whereby said proxy is configured to:
   receive, from a server in a second transport domain, a packet being directed to a communications device in a first transport domain;
   forward the packet to the communications device and send to the server a traffic handling offer message, the traffic handling offer message including a plurality of traffic handling options;
   receive from the server an indication of a selected one of the plurality of traffic handling options; and
   apply the selected traffic handling option to packets received from the server in the second transport domain, to be forwarded by the proxy to the communications device in the first transport domain.

2. The proxy of claim 1, wherein sending the traffic handling offer message comprises an initiation of a service offer negotiation between the server and the proxy.

3. The proxy of claim 1, wherein the plurality of traffic handling options comprises at least one of:
   unordered packet delivery;
   ordered packet delivery;
   packet acknowledgement by the proxy;
   prevent layer 2 retransmissions;
   header-only encryption of packets in the first transport domain; or
   IP-address preservation at handover.

4. The proxy of claim 1, wherein the proxy is further configured to receive an acknowledgement message from the communications device and to forward the received acknowledgement message to the server.

5. The proxy of claim 1, wherein the first transport domain is a wireless communications network, and the communications device is a wireless communications device.

6. The proxy of claim 1, wherein the packet received from the server and forwarded to the communications device by the proxy is a transport protocol setup request.

7. A method in a proxy, the method comprising:
   receiving from a server in a second transport domain, a packet being directed to a communications device in a first transport domain;
   forwarding the packet to the communications device and sending to the server a traffic handling offer message, the traffic handling offer message including a plurality of traffic handling options;
   receiving from the server an indication of a selected one of the plurality of traffic handling options; and
   applying the selected traffic handling option to packets received from the server in the second transport domain, to be forwarded by the proxy to the communications device in the first transport domain.

8. The method of claim 7, wherein the traffic handling offer message comprises an initiation of a service offer negotiation between the server and the proxy.

9. The method of claim 7, wherein the traffic handling options comprise at least one of:
   unordered packet delivery;
   ordered packet delivery;
   packet acknowledgement by the proxy;
   prevent layer 2 retransmissions;
   header-only encryption of packets in the first transport domain; or
   IP-address preservation at handover.

10. The method of claim 7, further comprising receiving an acknowledgement message from the communications device and forwarding the received acknowledgement message to the server.

11. A server, comprising a processor and a memory, said memory containing instructions executable by said processor whereby said server is configured to:
   send, to a proxy from a second transport domain, a packet being directed to a communications device in a first transport domain;
   receive from the proxy a traffic handling offer message, the traffic handling offer message including a plurality of traffic handling options to be applied by the proxy to packets directed to the communications device, sent by the server to the proxy from the second transport domain and to be forwarded by the proxy to the communications device in the first transport domain;

select one of the plurality of traffic handling options; and send an indication of the selection to the proxy.

12. The server of claim 11, wherein receiving the traffic handling offer message from the proxy comprises an initiation of a service offer negotiation between the server and the proxy.

13. The server of claim 11, wherein the traffic handling options comprise at least one of:

unordered packet delivery;

ordered packet delivery;

packet acknowledgement by the proxy;

prevent layer 2 retransmissions;

header-only encryption of packets in the first transport domain; or

IP-address preservation at handover.

14. The server of claim 11, wherein the first transport domain is a wireless communications network, and the communications device is a wireless communications device.

15. The server of claim 11, wherein the packet sent to the proxy is a transport protocol setup request.

16. A method in a server, the method comprising:

sending, to a proxy from a second transport domain, a packet being directed to a communications device in a first transport domain;

receiving from the proxy a traffic handling offer message, the traffic handling offer message including a plurality of traffic handling options to be applied by the proxy to packets directed to the communications device, sent by the server to the proxy from the second transport domain and to be forwarded by the proxy to the communications device in the first transport domain;

selecting one of the plurality of traffic handling options; and sending an indication of the selection to the proxy.

17. The method of claim 16, wherein the plurality of traffic handling options comprises at least one of:

unordered packet delivery;

ordered packet delivery;

packet acknowledgement by the proxy;

prevent layer 2 retransmissions;

header-only encryption of packets in the first transport domain; or

IP-address preservation at handover.

18. The method of claim 16, wherein the packet sent to the communications device via the proxy is a transport protocol setup request.

* * * * *